United States Patent
Brewer et al.

(10) Patent No.: US 7,058,315 B2
(45) Date of Patent: Jun. 6, 2006

(54) FAST DECISION THRESHOLD CONTROLLER FOR BURST-MODE RECEIVER

(75) Inventors: Tony M. Brewer, Plano, TX (US); Christopher P. Davies, Dallas, TX (US); Thomas C. McDermott, III, Richardson, TX (US); Allen F. Rozman, Richardson, TX (US)

(73) Assignee: Chiaro Networks Ltd., Richardson, TX (US)

( * ) Notice: Subject to any disclaimer, the term of this patent is extended or adjusted under 35 U.S.C. 154(b) by 740 days.

(21) Appl. No.: 09/974,575

(22) Filed: Oct. 9, 2001

(65) Prior Publication Data
US 2003/0067662 A1  Apr. 10, 2003

(51) Int. Cl.
*H04B 3/20* (2006.01)
(52) U.S. Cl. ............... 398/202; 370/286; 370/287; 370/332; 370/290
(58) Field of Classification Search ............ 398/202, 398/208, 210, 54; 370/352, 480, 286–290; 375/332, 324
See application file for complete search history.

(56) References Cited

U.S. PATENT DOCUMENTS

| | | | |
|---|---|---|---|
| 5,307,196 A | 4/1994 | Kinoshita | |
| 5,430,766 A | 7/1995 | Ota et al. | |
| 5,539,779 A | 7/1996 | Nagahori | |
| 5,600,679 A | 2/1997 | Kadowaki et al. | |
| 5,862,187 A * | 1/1999 | Dwarakanath et al. | 375/332 |
| 6,055,279 A | 4/2000 | Ota | |
| 6,191,879 B1 * | 2/2001 | Yanagisawa | 398/210 |
| 6,362,911 B1 * | 3/2002 | Lee et al. | 398/208 |
| 6,580,537 B1 * | 6/2003 | Chang et al. | 398/79 |
| 2001/0004388 A1 | 6/2001 | Hataeyama | |

FOREIGN PATENT DOCUMENTS

EP  0 909 046  4/1999

OTHER PUBLICATIONS

Kawai, M. et al., "Smart Optical Receiver with Automatic Decision Threshold Setting and Retiming Phase Alignment," Journal of Lightwave Technology, vol. 7, No. 11, Nov. 1989, pp. 1634-1640.

European Search Report issued for EP 02 25 6886, dated Dec. 3, 2004.

(Continued)

*Primary Examiner*—David C. Payne

(57) ABSTRACT

A repetitive burst-mode input signal that has a dark time portion, a preamble portion, and a payload portion is converted into a limited output signal in accordance with a decision threshold level, which is controlled by selectively coupling an averaged value of the burst-mode data amplitude to the decision threshold level. The timing sequence for selectively coupling the averaged signal value is controlled such that the average value of the burst-mode signal acquired during the preamble portion of the burst-mode signal is applied to the decision threshold level during substantially all of the payload portion. The control circuit may incorporate a phase-locked loop, which locks onto the repetitive dark time frequency and in response synthesizes a switchable track enable signal that controls the timing sequence of the decision threshold level. The phase-locked loop can employ all-digital, analog, and/or hybrid digital/analog circuitry.

26 Claims, 7 Drawing Sheets

FIG. 3

OTHER PUBLICATIONS

U.S. Appl. No. 09/703,057, System and Method for IP Router with an Optical, filed Oct. 31, 2000.

U.S. Appl. No. 09/703,056, "System and Method for Router Central Arbitration", filed Oct. 31, 2000.

U.S. Appl. No. 09/703,038, "System and Method for Router Data Aggregation and Delivery", filed Oct. 31, 2000.

U.S. Appl. No. 09/702,958, "Timing and Synchronization for an IP Router Using an Optical Switch", filed Oct. 31, 2000.

U.S. Appl. No. 09/703,027, Router Network Protection Using Multiple Facility Interfaces, filed Oct. 31, 2000.

U.S. Appl. No. 09/703,043, "Router Line Card Protection Using One-For-N Redundancy", filed Oct. 31, 2000.

U.S. Appl. No. 09/703,064, "Router Switch Fabric Protection Using Forward Error Correction", Oct. 31, 2000.

09/737,646, "System and Method for Router Packet Control and Ordering", filed Dec. 14, 2000.

U.S. Appl. No. 09/740,923, "System and Method for Router Queue and Congestion Management," filed Dec. 19, 2000.

U.S. Appl. No. 09/760,027, "System and Method for Router Arbiterr Protection Switching", filed Jan. 1, 2001.

Multiplex, Inc., MTXRX192AR, High-Performance Optical Receiver.

Conexant, CX60083, 10 Gbps High Gain Limiting Amplifier, dated Apr. 12, 2000.

\* cited by examiner

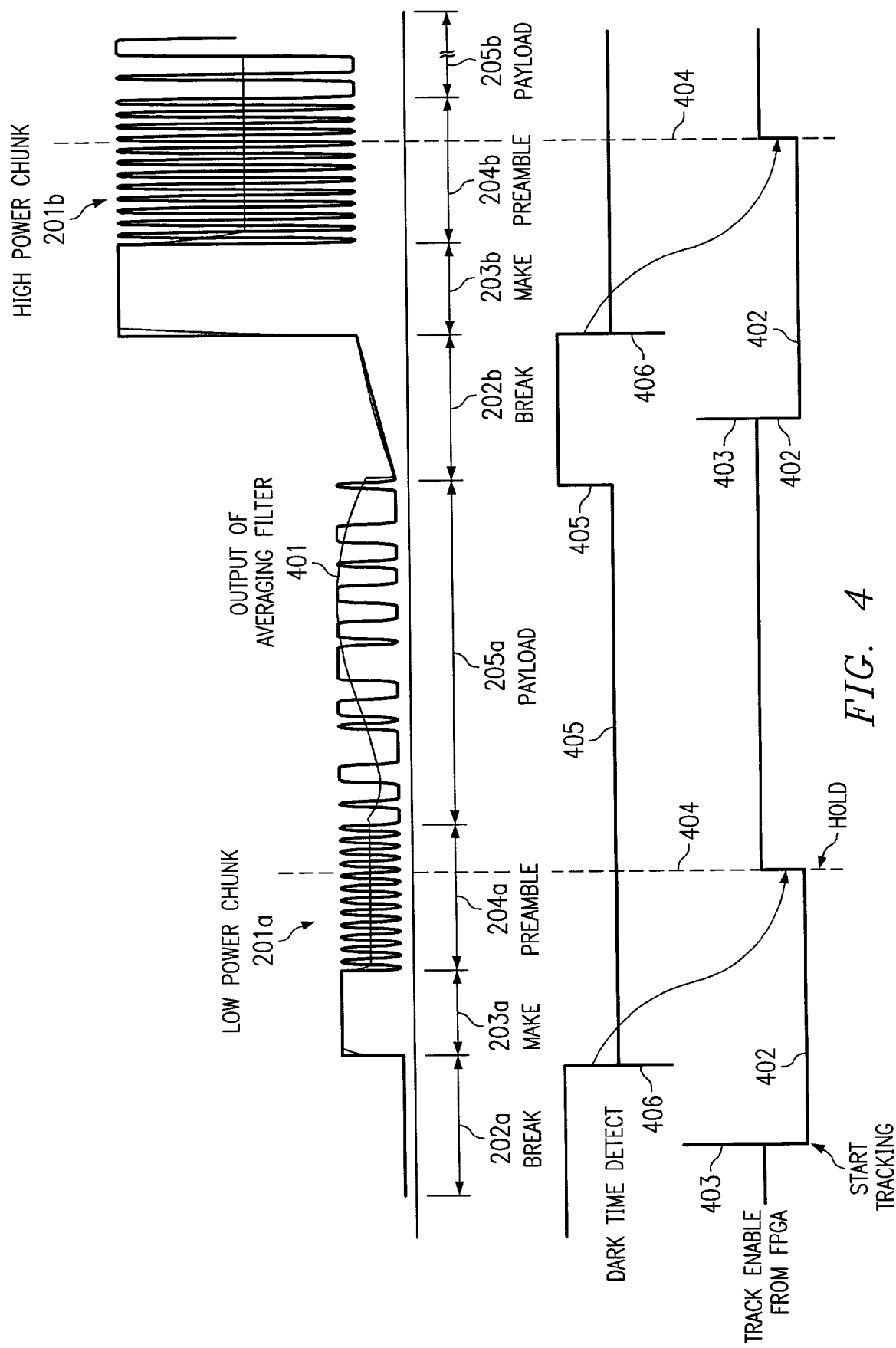

FAST DECISION THRESHOLD CONTROLLER FOR BURST-MODE RECEIVER

CROSS-REFERENCE TO RELATED APPLICATIONS

This application is related to co-pending and commonly assigned U.S. application Ser. No. 09/703,057, entitled "System and Method for an Optic Router," filed Oct. 31, 2000; co-pending and commonly assigned U.S. application Ser. No. 09/703,056, entitled "System and Method for Router Central Arbitration," filed Oct. 31, 2000; co-pending and commonly assigned U.S. application Ser. No. 09/737,646, entitled "System and Method for Router Packet Control and Ordering," filed Dec. 14, 2000; co-pending and commonly assigned U.S. application Ser. No. 09/703,038, entitled "System and Method for Router Data Aggregation and Delivery," filed Oct. 31, 2000; co-pending and commonly assigned U.S. application Ser. No. 09/702,958 entitled "System and Method for Router Sync Control," filed Oct. 31, 2000; co-pending and commonly assigned U.S. application Ser. No. 09/740,923, entitled "System and Method for Router Queue and Congestion Management," filed Dec. 19, 2000; co-pending and commonly assigned U.S. application Ser. No. 09/703,027, entitled "Router Network Protection Using Multiple Facility Interfaces," filed Oct. 31, 2000; co-pending and commonly assigned U.S. application Ser. No. 09/703,043, entitled "Router Line Card Protection Using 1:N Redundancy," filed Oct. 31, 2000; co-pending and commonly assigned U.S. application Ser. No. 09/703,064, entitled "Router Switch Fabric Protection Using Forward Error Correction," filed Oct. 31, 2000; and co-pending and commonly assigned U.S. application Ser. No. 09/760,027, entitled "System and Method for Router Arbiter Protection Switching," filed Jan. 12, 2001; the disclosures of which are all hereby incorporated herein by reference.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

FIG. 1 is a schematic diagram depicting a typical prior art optical receiver 10. Optical signal 109 is converted to electrical signal 110 at PIN detector 101 which is biased through bias circuit 108, and is driven into transimpedance amplifier (TIA) 102. In prior art receivers, output signal 111 from transimpedance amplifier 102 may be coupled through DC blocking capacitor 103 into input signal 112 of limiting amplifier 104, where it is compared with decision threshold level input signal 106, resulting in a limited output signal 105. Limiting amplifier 104, sometimes referred to as a decision circuit, is a high speed, high sensitivity comparator that quantizes the analog signal coming from TIA 102. The purpose of limiting amplifier 104 is to convert noisy, linear, analog output signal 111 from TIA 102 into well-defined high and low logic levels. The ability of limiting amplifier 104 to accurately determine if input signal 112 is logic high or logic low is highly dependent on the level and stability of decision threshold level signal 106. For a given input optical amplitude level, there is an optimal decision threshold level, which is usually at the midpoint between high and low logic levels from TIA 102. Small variations in the decision threshold level can directly affect the output crossing level, possibly resulting in logic level errors. Therefore, the quality and error rate of a receiver is directly dependent on how accurately the decision threshold level is set for a given input optical power level.

In conventional (non-burst-mode) optical transmission systems, the average power level of input optical signal 109 remains relatively constant. This facilitates the use of capacitive coupling through DC blocking capacitor 103 between transimpedance amplifier 102 and limiting amplifier (LA) 104, allowing the use of a fixed decision threshold level 106 in limiting amplifier 104. The average power level of optical signal 109 is relatively constant, varying due to thermal and aging effects, which typically occur slowly over long periods of time. However, there may still be a need to actively control the decision threshold level, or the gain of the TIA, in order to compensate for various offsets in the circuit and the slowly moving thermal and aging effects. There are examples in the prior art of circuits and systems intended to compensate for such variations. One example may be found in U.S. Pat. No. 6,191,879 (issued Feb. 20, 2001) in which the current of a PIN photo diode is controlled in order to cancel offsets in the system. Another example is found in U.S. Pat. No. 5,307,196 (issued Apr. 26, 1994) in which an offset voltage is added directly to the compare reference value.

BRIEF SUMMARY OF THE INVENTION

The present invention is directed to a system and method for controlling the decision threshold level in a burst-mode receiver. A repetitive burst-mode input signal that has a dark time portion, a preamble portion, and a payload portion is transmitted to a limiting amplifier, where it is converted into a limited output signal in accordance with a decision threshold level, which is controlled by selectively coupling an averaged value of the burst-mode data amplitude to the decision threshold level. The averaged value is generated by an averaging filter circuit in response to a small fraction of the energy tapped off from the input signal. The timing sequence for selectively coupling the averaged signal value to the decision threshold level is controlled by a control circuit coupled to the averaging filter circuit, such that the average value of the burst-mode signal acquired during the preamble portion of the burst-mode signal is applied to the decision threshold level during substantially all of the payload portion. In some embodiments, the control circuit incorporates a phase-locked loop, which locks onto the frequency generated by the repetitive dark time portion of the input signal and in response synthesizes a switchable track enable signal that controls the timing of the hold of the threshold level. The phase-locked loop can employ all-digital, analog, and/or hybrid digital/analog circuitry.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 4 is a timing diagram representing a set of exemplary waveforms illustrating the operation of the optical receiver system embodiment of FIG. 3;

DETAILED DESCRIPTION OF THE INVENTION

A data chunk (sometimes referred to as a packet) is a data structure for encapsulating data being transmitted through a communication system, for example a router, as described in co-pending and commonly assigned U.S. patent applications Ser. No. 09/703,057, entitled "System and Method for an Optic Router," filed Oct. 31, 2000; co-pending and commonly assigned U.S. application Ser. No. 09/703,038, entitled "System and Method for Router Data Aggregation and Delivery," filed Oct. 31, 2000; co-pending and commonly assigned U.S. application Ser. No. 09/702,958, entitled "System and Method for Router Sync Control," filed Oct. 31, 2000; co-pending and commonly assigned U.S. application Ser. No. 09/740,923, entitled "System and Method for Router Queue and Congestion Management," filed Dec. 19, 2000; and co-pending and commonly assigned U.S. application Ser. No. 09/703,064, entitled "Router Switch Fabric Protection Using Forward Error Correction," filed Oct. 31, 2000; the disclosures of which have all been incorporated herein by reference.

There are two main issues relating to detecting and recovering chunks in a burst-mode data transmission system. The first is a chunk-to-chunk clock phase offset caused by differing transmission path lengths in the system interconnection. For example, at 10 Gb/s transmission rate (OC192), only about 0.5 inches of optical fiber will shift the phase of the signal by 180 degrees. At 40 Gb/s (OC768), the problem is even more severe. A possible solution to this problem is to transmit a clock pattern during a preamble portion at the beginning of each chunk, and then quickly recover the clock during the preamble with a fast phase-locked loop. The second problem is the variation in amplitude of different chunks arriving from different sources through different transmission paths seen by the receiver. This chunk-to-chunk amplitude variation is caused primarily by differences in the channel-to-channel transmission path loss within, for example, an optical switch. Other transmission path losses, due for example to differences in fiber and interconnection interfaces as well as differences in transmitter power, further contribute to the amplitude variation.

Figure 1:
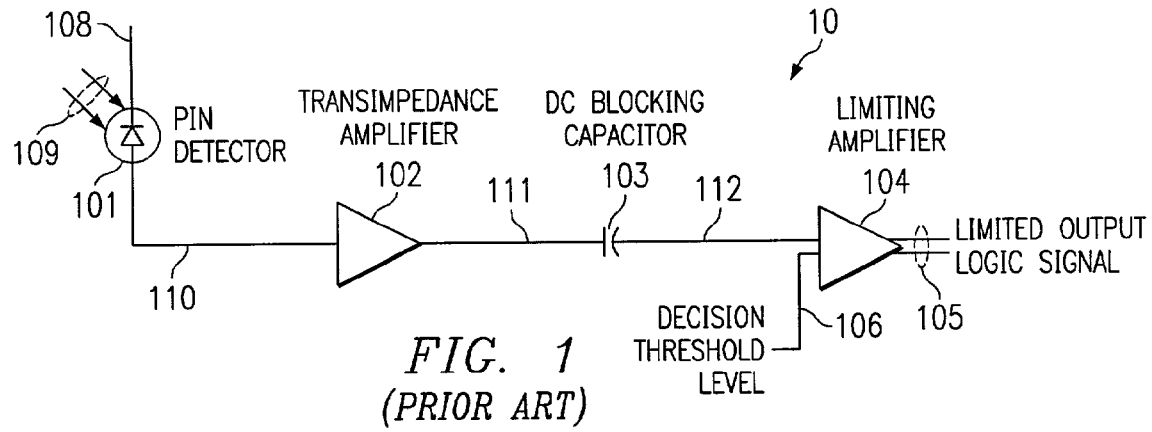
FIG. 1 is a schematic diagram depicting a typical prior art optical receiver.

Chunk-to-chunk amplitude variations become particularly troublesome as the signal is fed to a limiting amplifier, as illustrated in FIG. 1. In a burst-mode data format with significant chunk-to-chunk amplitude variations, capacitive coupling between TIA 102 and LA 104 is problematic, as the average DC voltage stored on capacitor 103 needs to change quickly on a chunk-to-chunk basis. This imposes conflicting requirements on blocking capacitor 103, as it needs to be large enough to present a low impedance to the data path, yet small enough to charge and discharge with nanosecond scale time constants.

Figure 2:
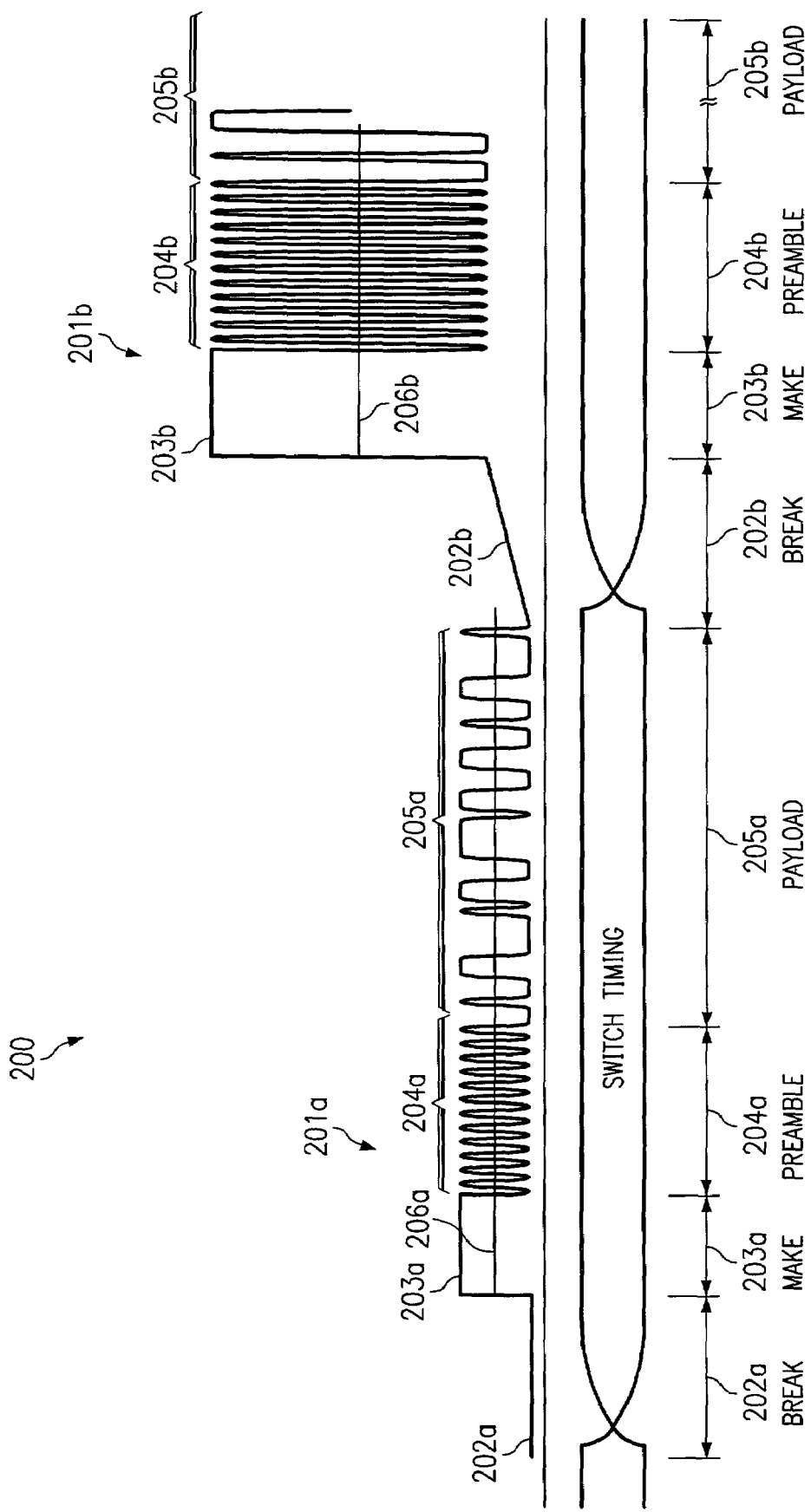
FIG. 2 is a timing diagram representing an example of an input signal with data arriving in bursts which have different average amplitudes.

An example of a burst-mode data signal 200 (for example an optical signal) is represented graphically in timing diagram FIG. 2, showing a voltage signal as at the output of transimpedance amplifier 102 of FIG. 1. The polarity of this signal may be inverted, if necessary. Depicted are two extremes of signals from low amplitude 201a and high amplitude 201b data chunks. Signal 201a, 201b is typically preceded by break period 202a, 202b, sometimes referred to as a "dark time," which represents the switching time of an optical switch, for example, or the time period when the transmitting lasers are set to some minimum, or dark, power level. Dark time may constitute the time between data chunks when the transmitter in a communication system is not transmitting any data. In some communication systems, a dark time is allocated, so that the system has an opportunity to perform switching of transmission paths such that no data is corrupted during the switching event. Following the dark time is optional short "make" period 203a, 203b, during which the data pattern is either all ones (logic high) or all zeros (logic low). Next is preamble 204a, 204b, or clock recovery period, during which the data pattern consists of alternating ones and zeros at the clock frequency, which facilitates clock recovery. Following the preamble is data or payload period 205a, 205b, which contains an irregular pattern of ones and zeros, constituting the actual data traffic and any administrative or forward error correction (FEC) data that may be necessary. Immediately following the payload is another break period, e.g., break period 202a, 202b, preceding the next data chunk signal, e.g., signal 201a, 201b, such that the above sequence repeats itself at regular intervals.

The ideal decision threshold level for the limiting amplifier is approximately midrange between the low logic and high logic levels of the preamble, which is also the average amplitude of the preamble portion, as depicted by ideal threshold levels 206a, 206b. It is clear from FIG. 2 that this ideal decision threshold level varies with signal amplitude level. In FIG. 2, for example, ideal midrange threshold level 206b of high amplitude chunk 201b does not intersect the maximum amplitude of low amplitude chunk signal 201a. In fact, the finite optical extinction ratio of lasers can lead to a condition wherein the low logic level of high amplitude chunk 201b is higher than the high logic level of low amplitude chunk 201a, as is shown in FIG. 2. Therefore a single, fixed threshold level is impractical in burst-mode optical receiver systems with significant chunk-to-chunk amplitude variations, e.g., optical receiver 10.

Needed in the art are a circuit and system capable of quickly and very accurately detecting the proper decision threshold level of an optical chunk having an arbitrary power level, and precisely applying this threshold level to the limiting amplifier during the remainder of that data chunk. The system must be capable of accepting data chunks of widely varying power level, in an arbitrary sequence, while maintaining a very accurate and stable threshold throughout the data payload to achieve low bit error rates (BER). Additionally, the system should be tolerant of an occasional missing chunk without compromising the subsequent threshold and data integrity. The system should also be tolerant of chunk-to-chunk timing variations, and of variations in the length and pattern of the data payload.

Figure 3:
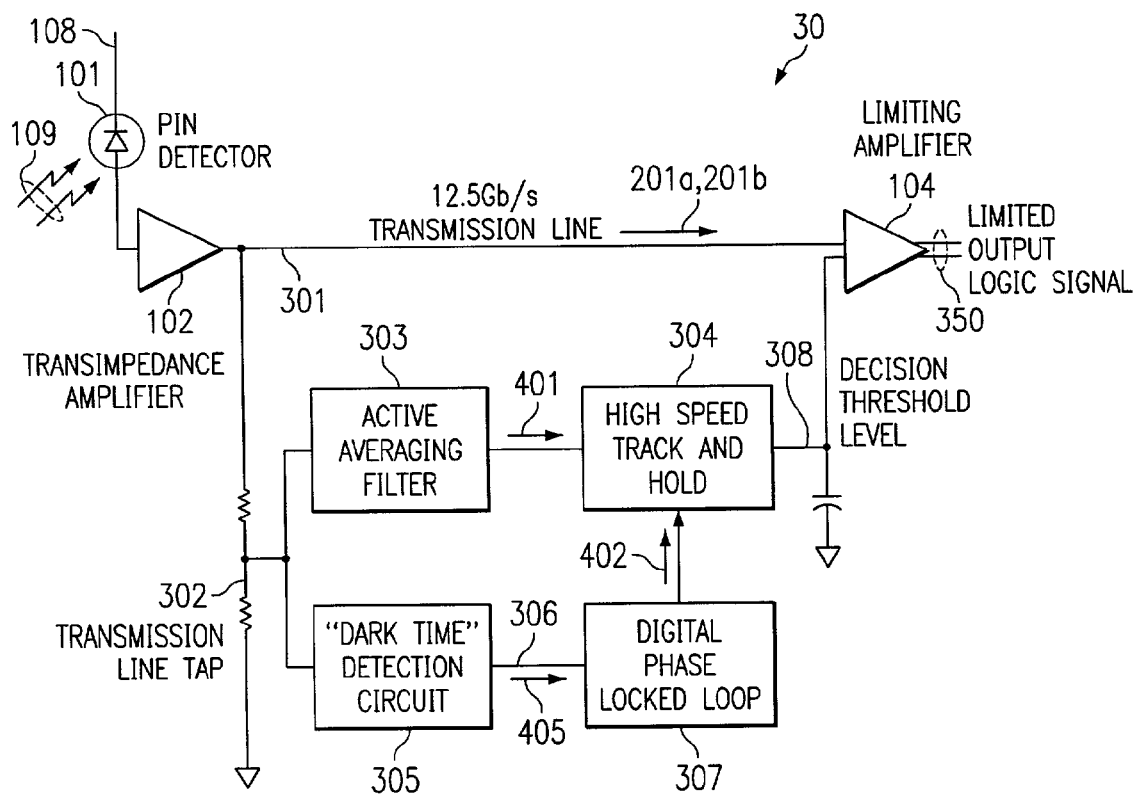
FIG. 3 is a high level schematic diagram illustrating an optical receiver system, according to an embodiment of the present invention.

FIG. 3 is a high level schematic diagram illustrating optical receiver system 30, according to an embodiment of the present invention. System 30 includes photodetector 101 coupled to transimpedance amp 102, which is further DC coupled to limiting amplifier 104 (no blocking capacitor in the data path) through very high speed (e.g., 12.5 GB/s) transmission line 301, constructed for example as a stripline or microstrip. Voltage tap 302 is provided along transmission line 301 to extract both DC and AC signal information while minimizing impedance discontinuities. It is important to minimize the impedance discontinuities in transmission line 301, as these can cause internal reflections, thus corrupting the data. Coupled to tap 302 is averaging filter 303 capable of extracting the average amplitude level of chunk signal 201a, 201b. Averaging filter 303 can provide gain, for example to offset the attenuation of tap 302. Averaging filter 303 is coupled to fast track and hold circuit 304, which outputs the decision threshold level 308 for payload period 205a, 205b.

Also coupled to tap 302 is dark time detection circuit 305, which outputs a synchronization pulse 405 at output port 306 synchronized with dark time 202a, 202b of chunk signal 201a, 201b. This synchronization pulse is then fed into phase-locked loop (PLL) circuit 307 which locks onto the falling edge of the dark time detect signal 405. PLL circuit 307 is employed in system 30 to smooth timing irregularities caused by chunk-to-chunk timing variations, jitter in dark time detector 305, etc., and also to allow the system to be tolerant of missing chunks. PLL 307 can be analog, digital, or a combination of both. PLL 307 controls the timing of track and hold circuit 304, locking down the correct value of decision threshold level 308 at the proper time.

Timing diagram FIG. 4 graphically represents a set of exemplary waveforms illustrating the operation of the system embodiment of FIG. 3. Superimposed on low amplitude 201a and high amplitude 201b data patterns is output signal 401 of averaging filter 303. Averaging filter 303 must be fast enough to respond to variations in chunk-to-chunk amplitude level, yet slow enough to reject most variations within data patterns of payload 205a, 205b and preamble 204a, 204b. FIG. 4 shows averaging filter 303 accurately extracting average value 401 of preamble 204a, 204b, and payload 205a, 205b. Typically there is substantially more variation of averaging filter output 401 during payload period 205a, 205b, because the payload may contain long uncompensated strings of ones and/or zeros. As illustrated in FIG. 4, these long strings can skew averaging filter output 401 during the payload period 205a, 205b of data pattern 201a, 201b. Therefore, depending on the data pattern, it may be undesirable to connect averaging filter 303 directly to decision threshold 308, as these variations could adversely affect the BER of the system. For this reason, fast track and hold circuit 304 is connected between averaging filter 303 and limiting amplifier 104. When track enable signal 402 is low, for example, at time 403 during break period 202a, 202b, averaging filter 303 is connected in a tracking mode to limiting amplifier decision threshold 308. This allows decision threshold 308 to settle quickly to the average value of preamble 204a, 204b, facilitating clock recovery. Near the end of preamble period 204a, 204b, track and hold circuit 304 enters a hold mode on rising edge 404 of track enable signal 402, locking in decision threshold 308 for the remainder of data payload period 205a, 205b.

In certain situations, it could be desirable to directly feed the decision threshold level from output 401 of averaging filter 303, even during the payload period. For example, if the payload pattern is encoded (or naturally occurring) such that long strings of ones or zeros do not occur, then the average value will not significantly drift from the ideal decision threshold level, and the receiver could operate with a low error rate. Also, if the optical power level is sufficiently large, moderate drift in the decision threshold level may not adversely affect data transmission. It may be advantageous to allow the receiver to default to a "track only" mode, wherein high speed track and hold circuit 304 is not configured in hold mode during the payload portion, but rather allowed to continuously track the data signal throughout the preamble and payload portions. This track only mode may be useful during initialization, for example, when phase-locked loop 307 has not yet achieved lock, or if PLL 307 loses lock for some time. In this mode, the decision threshold level still varies on a chunk-to-chunk basis substantially close to its ideal level, and any errors that result could be corrected using forward error correction.

Figure 5:
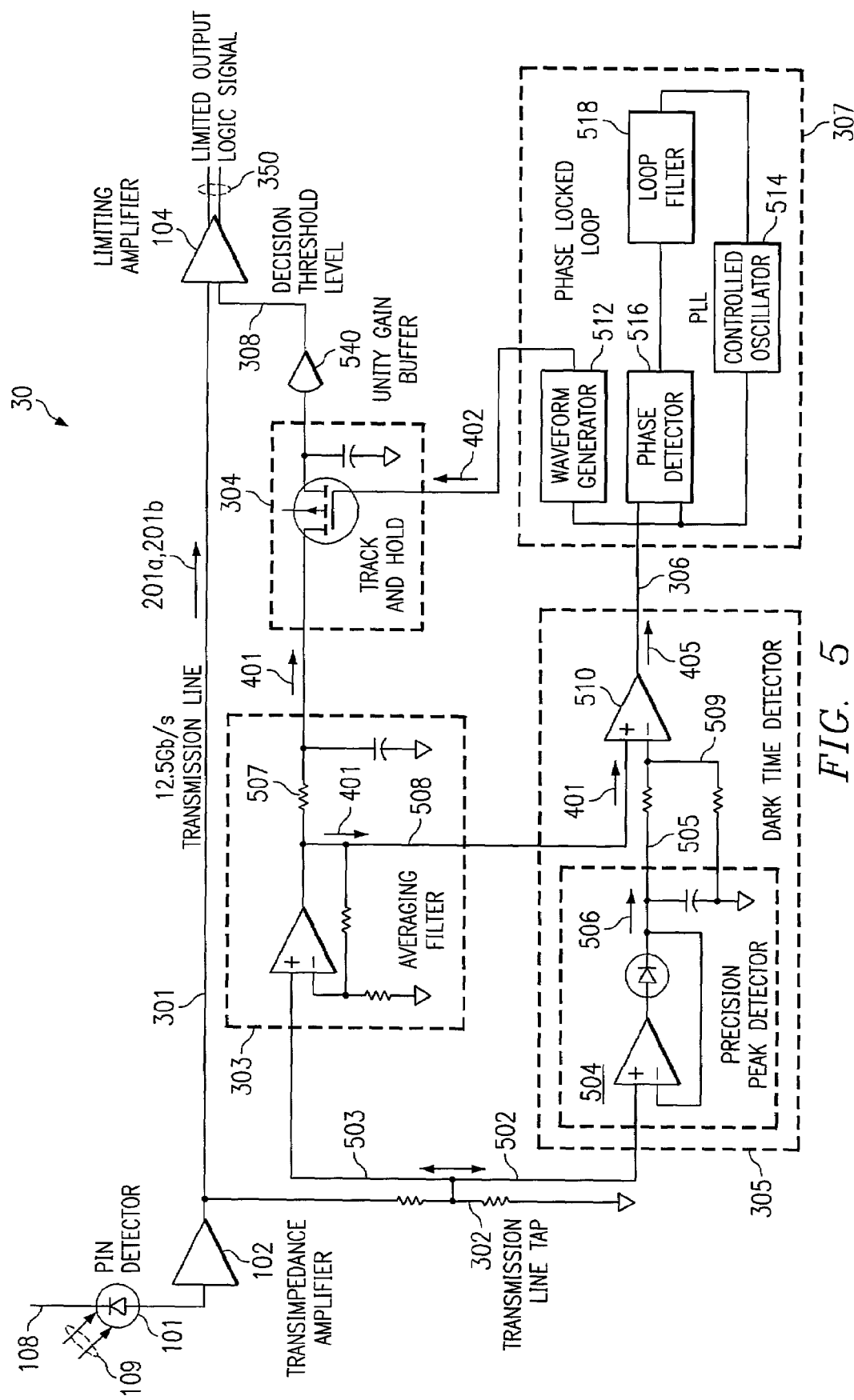
FIG. 5 is a schematic diagram depicting in more detail the optical receiver system of FIG. 3.
Figure 6:
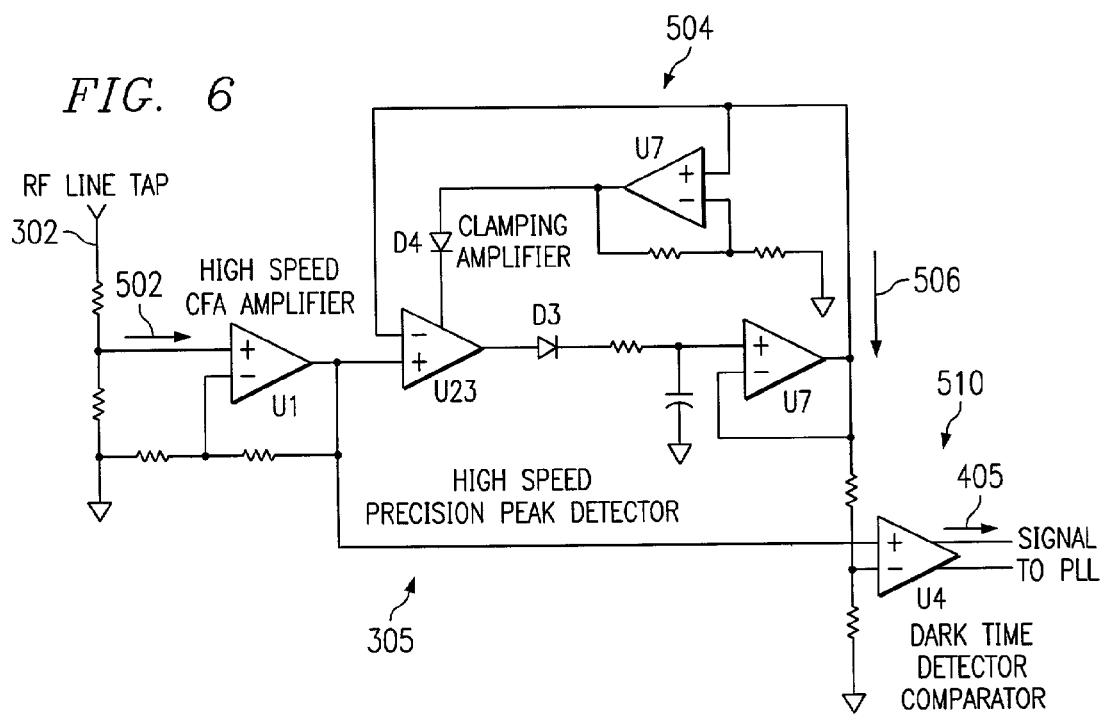
FIG. 6 is a schematic diagram illustrating in more detail an embodiment of a precision peak detector and a comparator of the dark time detector depicted in FIG. 5.
Figure 7:
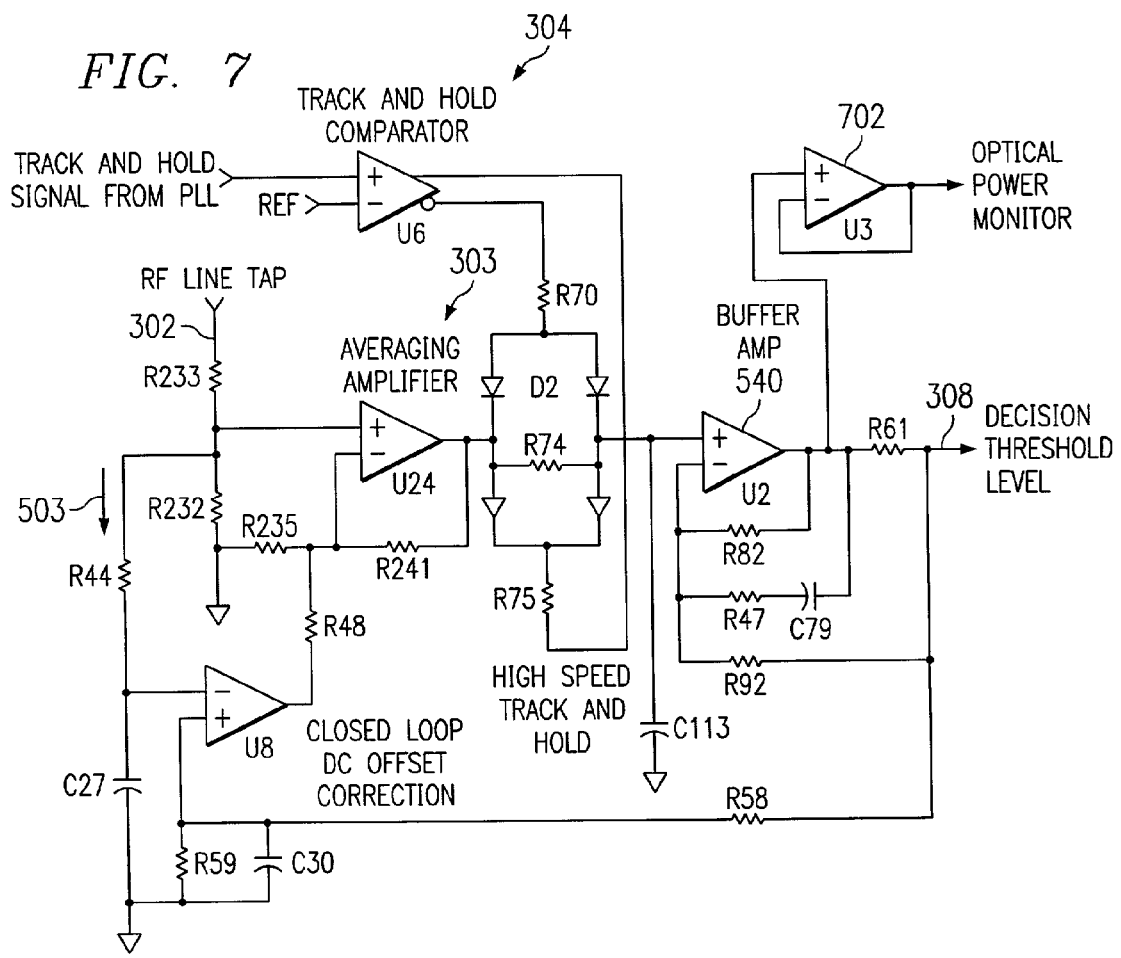
FIG. 7 is a schematic diagram illustrating in more detail an embodiment of an averaging filter, track and hold amplifier, and unity gain buffer amplifier depicted in FIG. 5.

FIG. 5 is a schematic diagram depicting in more detail optical receiver system 30 of FIG. 3. It will be noted that the circuits of FIGS. 5, 6, and 7 are configured to process a burst-mode signal whose polarity is inverted relative to that shown in FIGS. 2 and 4. In FIGS. 2 and 4, the dark time level is located at approximately the lowest amplitude. The circuits of FIGS. 5, 6, and 7 require a burst-mode signal having the dark time level located at approximately the highest amplitude. However, it is understood that a circuit configured to process a burst-mode signal of a different polarity is within the spirit and scope of the present invention. High speed transmission line 301 couples transimpedance amplifier 102 to limiting amplifier 104. Resistive divider tap 302 off transmission line 301 extracts a small fraction of the signal energy. The stepped down signal branches in two directions. One branch 502 goes through precision peak detector circuit 504 within dark time detector 305, which provides a DC voltage 506 at the level of the dark time at output 505. Precision peak detector circuit 504 does not detect the peak of the high frequency data stream (e.g., 12.5 GHz), but rather the peak level of the dark time. Branch 503 leads to averaging filter 303, which has bandwidth significantly narrower than the data rate, such that output signal 401 is an average value of the data signal. As illustrated in FIG. 4, during preamble period 204a, 204b consisting of alternating ones and zeros, the level of output signal 401 of averaging filter 303 is established substantially halfway between the one and the zero level.

Output signal 401 of averaging filter 303 then branches in two different directions. In one branch 508 output signal 401 is coupled to comparator 510 within dark time detector 305. The two input signals to comparator 510 are the level of dark time DC signal 506 from precision peak detector 504 slightly divided down through voltage divider 509 and output signal 401 of averaging filter 303, which is a lower frequency representation of real time data signal 201a, 201b. Although the lower frequency response of the averaging filter prevents it from reproducing the high frequency data stream, the averaging filter is capable of accurately reproducing the time dependent dark time level. Therefore, the dark time level on signal 401 is always higher (or lower, depending on the polarity used) than the divided down peak detector signal 506. When the voltage levels of signals 401 and 506 cross, comparator 510 outputs synchronization pulse 405, substantially in phase with and for the duration of the dark time, as is shown in FIG. 4. Synchronization pulse 405 is then fed into phase-locked loop circuit 307, which can be implemented optionally as an all-digital phase-locked loop. In the illustrated embodiment, the timing of synchronization pulse 405 may be unsuitable to directly drive track and hold circuit 304, as the falling edge of pulse 405 may occur later than desired. However, phase-locked loop circuit 307 outputs track enable signal 402, which may be timed to slightly anticipate the arrival of synchronization pulse 405. Additionally, phase-locked loop circuit 307 smoothes out frequency or period variations that can occur in synchronization pulse 405, due for example to normal noise and component tolerances. Moreover, in the present system, it is possible to have missing chunks, leading occasionally to missing synchronization pulse 405. Phase-locked loop 307 provides a level of frequency inertia in the system, tolerant of an occasional missing synchronization pulse 405, and thus ignores the missing pulse without drifting substantially in frequency and adversely affecting subsequent data processing.

PLL circuit 307 locks onto falling edge 406 of dark time detect signal 405 and generates an internal signal that is frequency and phase aligned with falling edge 406. Waveform generator 512 internal to PLL circuit 307 outputs track enable signal 402 to track and hold circuit 304. Because PLL circuit 307 is locked onto periodically repeating dark time detect signal 405, track enable signal 402 can anticipate falling edge 406 of dark time detect signal 405, thereby extending the tracking period between track start time 403 and hold start time 404. Additionally, controlled oscillator 514 inside PLL circuit 307 can be designed advantageously with a degree of frequency inertia, allowing oscillator 514 to tolerate occasional missing chunks from the data stream without losing lock or drifting in frequency appreciably. Conventionally, a phase-locked loop circuit, for example PLL circuit 307, includes phase detector function 516 and loop filter function 518. PLL circuit 307 thus provides a robust, reliable track enable signal 402 as timing input to track and hold circuit 304. In an embodiment of the present invention, PLL circuit 307 may incorporate an all-digital PLL using a Field Programmable Gate Array (FPGA). Alternatively, PLL circuit 307 can incorporate an analog circuit or a combination of analog and digital circuitry.

The amplitude input signal to track and hold circuit 304 is output signal 401 of averaging filter 303. The objective is to open a tracking window during dark time 202a, 202b to allow decision threshold level 308 to reach average value of signal 401 during preamble 204a, 204b, and then at time 404 before the end of the preamble period to toggle track and hold circuit 304 back into a hold mode to lock down the preamble level of average output signal 401 during the remaining chunk period as decision threshold 308 of limiting amplifier 104, thereby maintaining the proper decision threshold 308 for the entire remainder of the chunk. Track and hold circuit 304 should advantageously be made fast enough to accurately track output 401 of averaging filter 303, such that when the following chunk arrives at output transimpedence amplifier 102 with a different amplitude level that leads to a different average level of output signal 401, track and hold circuit 304 can very quickly recover to the proper decision threshold level 308 and lock it down for the following chunk, consequently providing a very fast chunk-by-chunk threshold adjust. An advantage of this approach is that the circuitry is not required to detect the peak (or valley) level of the actual data stream. Accurately detecting the peak of a 12.5 GHz signal, for example, would be costly and difficult to accomplish with conventional, off the shelf analog circuits, such as op-amps. The problem clearly gets much worse as data rates rise to 40 Gb/s and above. Rather, averaging filter 303 and track and hold circuit 304 are designed intentionally to reject the high frequency data rate and extract only the average value of the signal. Therefore, as data transmission rates increase, the utility of the described embodiment is undiminished.

Referring again to FIG. 4, in a real system average level signal 401 of preamble 204a, 204b oscillates slightly throughout the preamble with the time constant of averaging filter 303 during the track mode, so that it facilitates clock and data recovery. The goal behind the structure of the data chunk is to have a very short preamble (e.g., low overhead) relative to a very long payload. Therefore it is important for averaging filter 303 to have a short enough time constant, so that average level signal 401 quickly settles to the value midway between ones and zeros. The ones and zeros may occur, for example, at over 12 gigabits per second, which may be too high a frequency for conventional op-amps to accurately amplify.

The detailed designs of a PIN detector, transimpedance amplifier, and limiting amplifier are well understood in the art and will not be discussed here. An example of a commercially available product employing a PIN diode and a TIA is part number "MTXRX192AR", manufactured by Multiplexer, Inc., located at 115 Corporate Blvd., South Plainfield, N.J. An example of a commercially available limiting amplifier is part number "CX60083", manufactured by Conexant Systems, Inc., located at 4311 Jamboree Road, Newport Beach, Calif.

FIG. 6 is a schematic diagram illustrating in more detail an embodiment of precision peak detector 504 and comparator 510 within dark time detector 305. High speed amplifier U1 buffers branched signal 502 from transmission line tap 302 and provides signal gain. Because the bandwidth of conventional op-amps is usually limited to the low GHz range or less, amplifier U1 cannot respond to the high frequency data stream and as such performs a low pass filtering function. Additional low pass filtering may be provided by various active or passive filters (not shown). The components associated with amplifiers U23, U7, and diode D3, constitute precision peak detector 504, which provides voltage signal 506 that is substantially equal to the peak value at the output of amplifier U1. Because of the very short duration of the dark time signal, perhaps as short as 20ns in some systems, amplifier U23 may be configured advantageously as a clamping amplifier. Diode D4, along with amplifier U7, prevents the output of U23 from saturating to the negative power supply rail during the non-dark time interval. With the output clamped in this way, U23 may respond more quickly to the dark time signal when it arrives, which may improve the accuracy of peak detect voltage signal 506. Peak detect voltage signal 506 is then divided down slightly and compared with the instantaneous output signal of amplifier U1 using comparator U4 (comparator 510 in FIG. 5). The output signal of comparator U4 is pulse train 405 synchronous with dark time portion 202a, 202b of the data signal. As illustrated in FIG. 5, this pulse train (dark time detect signal 405) is coupled into PLL circuit 307, where it is used to synthesize track enable signal 402.

FIG. 7 is a schematic diagram illustrating in more detail an embodiment of averaging filter 303, track and hold amplifier 304, and buffer amplifier 540. U24 is a high speed amplifier that buffers signal 503 from transmission line tap 302 and provides signal gain. Because the bandwidth of conventional op-amps is usually limited to the low GHz range or less, amplifier U24 cannot respond to the high frequency (e.g., OC197 or OC768) data stream and as such performs a low pass filtering function. Additional low pass filtering is provided by track and hold circuit 304. Comparator U6, diode bridge D2, resistors R70 and R75, and capacitor C113 form very high speed track and hold circuit 304. Diode bridge D2 may be constructed advantageously using hot carrier diodes, allowing them to be switched on and off by comparator U6 very quickly and with a minimum of charge injection. However, the addition of R74 changes the operation of the circuit from a pure track and hold to a fast track, slow track operating mode. In fast track, the bandwidth of the circuit is defined by time constants of C113, R70 and R75. In slow track, the diodes in bridge D2 are reverse biased, removing R70 and R75 from the circuit. R74 now connects U24 to C113, allowing U24 to influence the voltage on C113 through R74. In practical terms, the resistance of R74 ranges from several times to roughly 10 times the resistance of R70 and R75. This mode of operation can be useful, for example, in counteracting the effects of unavoidable offsets in the circuit, such as charge injection or pedestal error. The fast track, slow track mode could also be useful in counteracting the effects of finite switching time in an optical switch. The optical signal at the output of the optical switch may take some time to settle to its final value, and may not have settled completely at the end of the preamble. If the track and hold circuit were to be configured in a track mode before the optical signal has settled completely, the decision threshold will have an offset error for the remainder of the payload period. If configured in slow track mode instead of a pure hold mode, however, the decision threshold would be allowed to seek the correct average value, perhaps minimizing the offset error caused by finite switching time. There would be a trade-off, of course, between data pattern induced ripple in the decision threshold during the slow track mode, and the possible switching time related offset error during a pure hold mode.

Amplifier U2 provides a very high input impedance buffer function, buffering hold capacitor C113 from the control input of limiting amplifier 104 (not shown in FIG. 7) and outputting decision threshold level 308. A frequent problem with a fast track and hold (or fast track, slow track) circuit 304 is that each op-amp in the circuit, and in particular diode bridge D2, adds an undesirable DC offset error to the circuit. Contributing to this DC offset error are, for example, initial component tolerances, temperature and aging effects, and other secondary effects. If this offset error is substantial enough, some type of calibration process may be required to minimize the offset error. In an embodiment, op-amp U8 and its associated components can be used as a means of actively compensating for this offset error in a closed loop manner.

Figure 8:
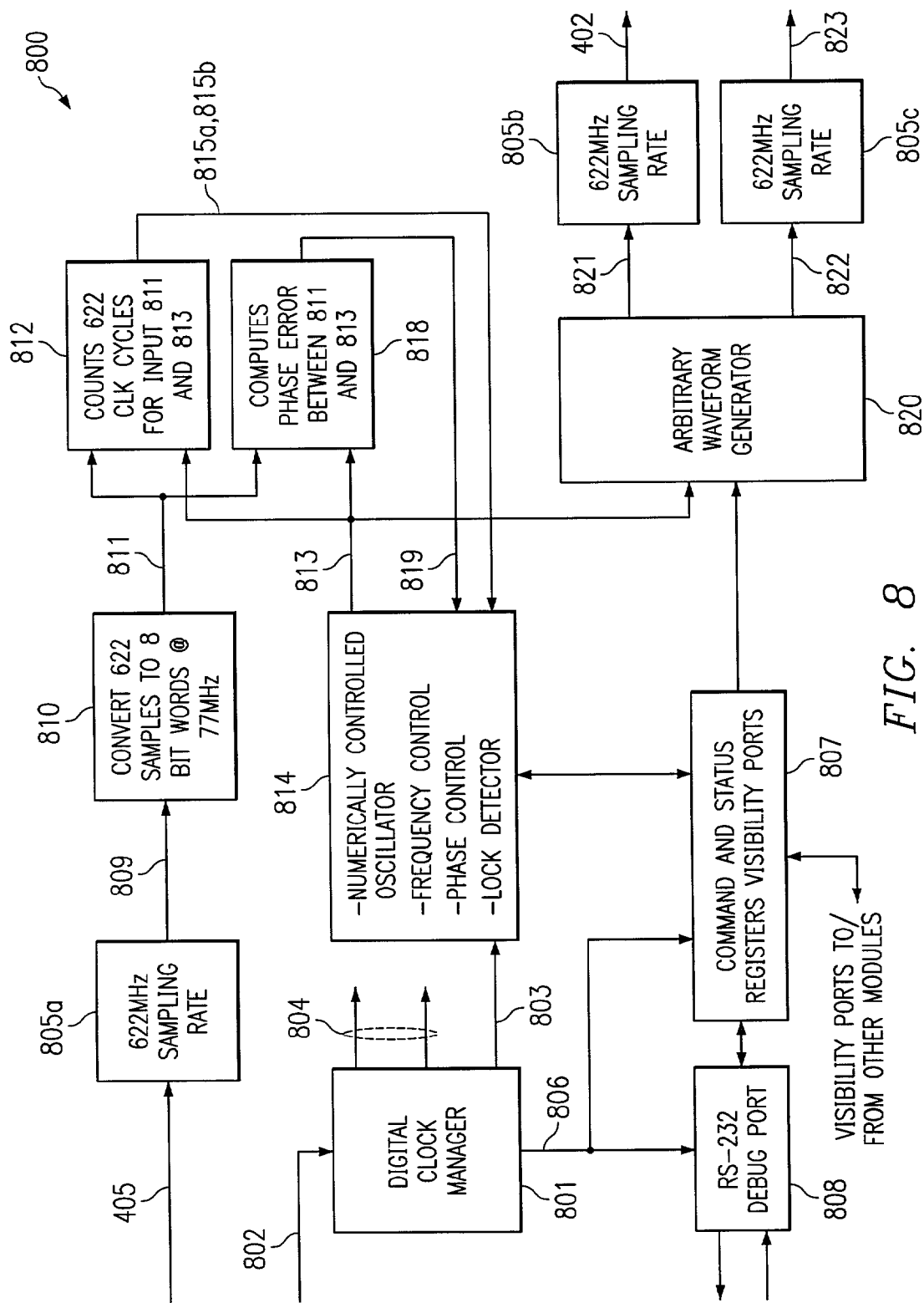
FIG. 8 is a block diagram illustrating the I/O signals and FPGA modules in an all-digital phase-locked loop, in accordance with embodiments of the present invention.

FIG. 8 is a block diagram illustrating the I/O signals and FPGA modules in an all-digital PLL, in accordance with embodiments of the present invention. FPGA 800 provides an all-digital phase-locked loop function used to acquire and lock onto dark time detector signal 405 derived directly from the output of TIA 102 and to output aperture window (track enable) signal 402 to high speed track and hold circuit 304. Aperture window signal 402 is designed to configure track and hold circuit 304 into a track mode during dark time 202a, 202b and preamble period 204a, 204b. The output of track and hold circuit 304 sets decision threshold level 308. Additionally, FPGA 800 performs a number of secondary functions, as will be described below in more detail.

A digital clock manager module 801 instantiates two Xilinx DCM primitives that control clock skew and perform clock frequency multiplication and division. The input is a 155 MHz clock 802. The first DCM primitive divides the 155 MHz input clock into a 77.8 MHz main system clock 803. Also generated are two phases 804 of a 311 MHz clock distributed to input and output double data rate (DDR) modules 805a–805c. The second DCM primitive divides down the 77.8 MHz main system clock to a 38.8 MHz clock 806, distributed to a CSR module 807 and an optional RS-232 debug port 808.

Input double data rate (DDR) module 805a uses both edges of 311 MHz clock 805 to sample dark time synchronization signal 405 at an effective rate of 622 MHz. Input DDR module 805a outputs two interleaved, serial data streams 809 to chunk detector input module 810, which performs a shift register function, converting data streams 809 into 8-bit bytes 811 at a 77 MHz data rate. Each byte 811 contains the last 8 samples of dark time synchronization signal 405 with the LSB of byte 811 containing the most recent sample.

Frequency counter module 812 inputs 8-bit byte 811 from chunk detector input 810 and an 8-bit byte from numerically controlled oscillator (NCO) module 814, operating at 77 MHz. This module counts the number of 622 MHz clock cycles between falling edges of both inputs 811, 813, and outputs this information 815a, 815b to NCO module 814, which measures and outputs the period (as opposed to the frequency) of each signal 811, 813 (in 622 MHz clock cycles). Eight-bit bytes 815a and 815b respectively measure the instantaneous period of each input. This information is outputted to CSR module 807 as a visibility port readable through debug port 808.

Also calculated is the average period of inputs 811 and 813 outputted as 8-bit bytes 816a and 816b, each of which represents a rolling average of the last 8 period calculations. These average period measurements are used by NCO module 814 to provide frequency equalization in the event the PLL loses lock. This information is also outputted to module CSR 807 as a visibility port, readable through debug port 808.

Phase detector module 818 detects the phase difference between inputs 811 and 813 and also detects whether the phase is leading or lagging. It accomplishes this using a shift register structure. Because of the relatively large amount of math required at 77 MHz to compute the phase error, phase detector module 818 parallel processes the result of all possible phase errors each clock cycle, then outputs the correct phase error 819 based on the position of the falling edge of synchronization signal 405. This parallel processing structure is advantageous to meet timing.

Numerically controlled oscillator (NCO) module 814 provides a variety of functions, as described below. NCO 814 contains a 32 bit, accumulator based numerically controlled oscillator (NCO), which is controlled by a numerical seed value, which directly controls the frequency of the NCO. Because the seed value is 32-bits wide, the frequency resolution of the NCO is approximately 0.1 Hz when using a 77 MHz system clock. The output of the NCO is 8-bit byte 813, each bit representing a single sample at 622 MHz achieved by processing each of the 8-bits in byte 813 in parallel every 77 MHz clock cycle.

Figure 9:
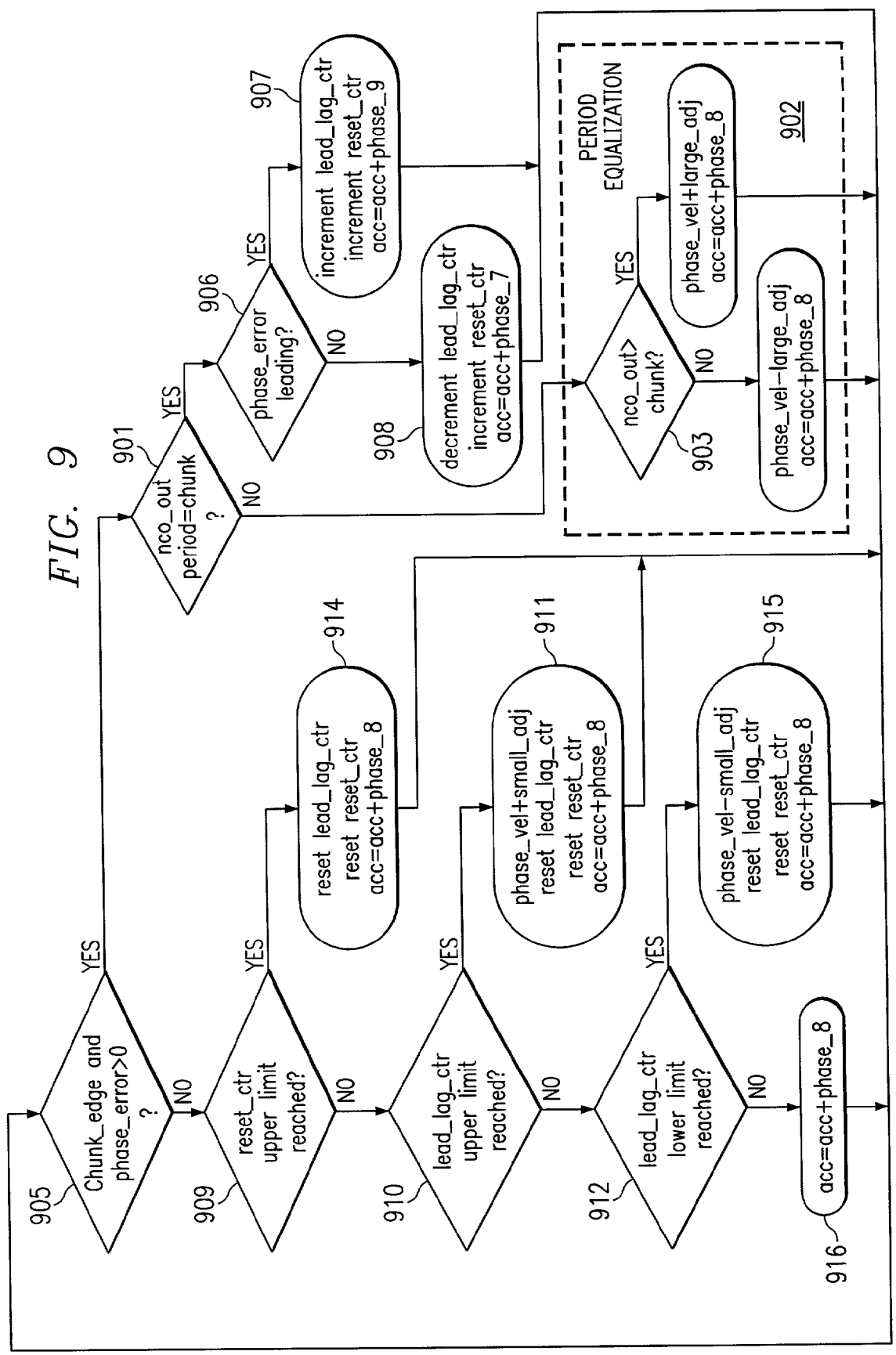
FIG. 9 is a flow diagram illustrating the operation of a numerically controlled oscillator module in the all-digital phase-locked loop depicted in FIG. 8.

The feedback loop for the PLL is contained within NCO module 814. There are two loops, depending on the relative periods of the NCO and chunk detector 810. FIG. 9 is a flow diagram illustrating the operation of NCO module 814. If the average periods of the NCO and the chunk detector are significantly different in step 901, NCO 814 will enter a period equalization loop 902. No attempt is made at phase equalization in this loop. This period control loop is executed only after a chunk edge is detected, as illustrated in FIG. 9. If the NCO periods is greater than the chunk period at step 903, phase_velocity is increased by an amount defined in a register "phase_vel_control", contained in CSR module 807. The converse is true if the period is smaller. This loop is exited when the periods are within a few 622 MHz clock periods of each other. Phase_velocity is adjusted only if a chunk edge is detected at block 905. If the chunk signal goes away entirely, or one or more chunks is missing, then phase_velocity, and hence the NCO frequency, will not be changed.

The phase/frequency loop is entered only if a chunk edge is detected, the phase error is non-zero, and the two periods are substantially equal to each other. Phase may be adjusted at each chunk edge by manipulating the accumulator value. If the phase_error is leading at block 906, the accumulator is updated at block 907 with the value "acc=acc+phase_9". This action will shift the phase in the lagging direction by one 622 MHz clock cycle. If the phase is lagging at block 906, the accumulator is updated with the value "acc=acc+phase_7", which will shift the phase at block 908 in the leading direction by one 622 MHz clock cycle. Note that phase_velocity, and hence frequency, is not changed along with the phase. Frequency is updated at blocks 907 and 908 through the use of two additional counters, lead_lag-ctr and reset_ctr. After both counters are initialized, each time the phase_error is detected as leading, the lead_leg-ctr and the reset_ctr are incremented. If the phase_error is lagging, the reset_ctr is incremented but the lead_lag-ctr is decremented. In this process, if the phase error is leading more often than it is lagging, the lead_lag-ctr will eventually reach its upper limit at block 910 and phase_velocity, and hence the frequency, will be increased slightly at block 911.

Both counters are initialized after a phase velocity adjustment. If enough cycles pass such that the reset_ctr reaches its upper limit at block 909 before the lead_lag-ctr reaches either the upper limit at block 910 or the lower limit at block 912, both counters are initialized at block 914 and no adjustment is made. Conversely, if lead_lag-ctr reaches the lower limit at block 912, phase_vel is decremented slightly at block 915. If the accumulator is not otherwise updated through the loop, then it is updated at block 916 with the value "acc=acc+phase_8." The counter initialization values and upper and lower limits are set in CSR module 807 using registers "phase_vel_control", lead_lag_limits," and "reset_ctr_up_limit.

This algorithm produces a very fast phase adjustment, but adjusts frequency very slowly. Importantly, in this PLL the NCO does not drift in the presence of missing chunks. In this way, the NCO will have a high degree of "inertia," and once locked to the chunk signal, will tend to remain locked even during the occurrence of missing chunks. NCO module 814 also includes a routine to determine the locked state of the PLL, and a counter measuring the number of times that lock is lost.

Waveform generator module 820 outputs one or more arbitrary waveforms whose rising and falling edges are precisely set relative to falling edge of NCO output 813. The timings of these rising and falling edges relative to the falling edge of NCO output 813 is determined by registers in CSR module 807. These output waveforms are active only if the PLL is in a locked state.

Waveform generator module 820 outputs two 8-bit bytes, "track_hold_waveform" 821 and "comp_enable_waveform" 822, which are used as inputs to output DDR modules 805b, 805c. Track_hold_waveform 821 is used by DDR module 805b to generate track enable signal 402 used by the fast track and hold circuit. Comp_enable_waveform 822 is used by DDR module 805c to establish an aperture window 823 to enable the comparator in the chunk detector circuitry.

Waveform generator module 820 generates the waveforms using a series of simple shift registers. The waveform to be outputted is loaded from waveform CSRs located in CSR module 807. When the falling edge of NCO output 813 is detected, edge_detect signal goes true, whereupon the exact position of this edge within the byte is stored in a register "index_latch," and the waveform CSRs are loaded into shift registers. The value in index_latch then determines which bit positions in the shift register are outputted as the waveform bytes.

Output DDR modules 805b, 805c use both edges of 311 MHz clock 804 to output track enable signal 402 and comparator enable aperture window 823 at an effective data rate of 622 MHz. Each module 805b, 805c accepts 8-bit byte 821, 822 from waveform generator 820 at a 77 MHz data rate, and sequentially shifts the contents of this byte LSB first to respective output 402, 823 at an effective data rate of 622 MHz.

CSR module 807 contains all of the command and status registers for the PLL, along with visibility ports used for optional debug. Many of the registers can be read and/or modified through optional debug RS-232 port 808. CSR module 807 runs on 39 MHz system clock 806 in order to meet timing. All registers required to cross from the 39 MHz into the 77 MHz clock domain are double registered (in each direction, if necessary) to prevent timing errors.

A potential additional application of embodiments of the present invention is to use the timing and analog level signals generated, e.g., dark time detector output 405 or PLL output 402 along with the output of track and hold circuit 304, for example using circuitry associated with op-amp U3 (702) shown in FIG. 7, to accurately derive instantaneous input power level measurements for an incoming data signal, particularly relative input power level measurements that might be useful for diagnostic purposes in the rest of the system. The amplitude of individual data chunks could actually detect and identify if one transmitter has a low or fading output, for example out of 64 transmitters transmitting into a single receiver.

Another potential application is a DC threshold restoration for video amplifiers on a much slower frequency scale. Because the present circuit is much faster and more intelligent, it could find applications in fast video switching and amplification, where a video amplifier is receiving signals from an analog switch and/or more than one video source, such that the different inputs have significantly different power levels, or where there are significant lengths of time when no input signal is present.

Additionally, the current system architecture applied here to an optical switching fabric could alternatively be applied in the electrical domain, in which signals come from different transmitters and go through an electric switching fabric, where they have different transmission paths with different transmission losses. Different amplitude electrical chunks coming from different transmitters through different paths into one receiver raise the same burst-mode threshold level issue as in the embodied burst-mode optical receiver.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus for controlling the decision threshold level of a decision circuit in a burst-mode receiver, comprising:
    an averaging filter circuit configured to receive a burst-mode data transmission signal, said averaging filter circuit operable to output an average value of said burst-mode data transmission signal; and
    a control circuit coupled to said averaging filter circuit, said control circuit operable to couple said average value of said burst-mode data transmission signal acquired during a preamble portion of said burst-mode data transmission signal to said decision threshold level during substantially all of a payload portion of said burst-mode data transmission signal, wherein said control circuit comprises a track and hold circuit operable in response to a switchable track enable signal to track said average threshold value of said burst-mode data transmission signal during said preamble portion of said burst-mode data transmission signal and otherwise to hold said average threshold value of said average value of said burst-mode data transmission signal acquired during said preamble portion of said input signal and to couple said held average threshold value to said decision threshold voltage level during substantially all of said payload portion.

2. An apparatus for controlling the decision threshold level of a decision circuit in a burst-mode receiver, comprising:
    an averaging filter circuit configured to receive a burst-mode data transmission signal, said averaging filter circuit operable to output an average value of said burst-mode data transmission signal; and
    a control circuit coupled to said averaging filter circuit, said control circuit operable to couple said average value of said burst-mode data transmission signal acquired during a preamble portion of said burst-mode data transmission signal to said decision threshold level during substantially all of a payload portion of said burst-mode data transmission signal, wherein said control circuit comprises a track and hold circuit operable in response to a switchable track enable signal to track said average threshold value of said burst-mode data transmission signal during said preamble portion of said burst-mode data transmission signal and otherwise to hold said average threshold value of said average value of said burst-mode data transmission signal acquired during said preamble portion of said input signal and to couple said held average threshold value to said decision threshold voltage level during substantially all of said payload portion, and wherein said control circuit further comprises a phase-locked loop circuit coupled with said track and hold circuit, said phase-locked loop circuit operable to repetitively switch said track enable signal in response to a repetitive dark time synchronization input pulse.

3. The apparatus of claim 2 wherein said phase-locked loop circuit comprises circuitry selected from the group consisting of all-digital circuitry, analog circuitry, and hybrid digital and analog circuitry.

4. The apparatus of claim 2 wherein said repetitively switched track enable signal occurs before said repetitive dark time synchronization input pulse relative to said preamble portion of said data signal.

5. The apparatus of claim 2 operable to receive a data signal having a data transmission rate of approximately 12.5 gigabit per second.

6. The apparatus of claim 2 wherein said control circuit further comprises a dark time detector circuit coupled with said phase-locked loop circuit, said dark time detector circuit operable to generate said repetitive dark time synchronization pulse at regular intervals in response to the instantaneous amplitude of said data signal relative to a peak amplitude of said data signal during a dark period prior to said preamble portion.

7. The apparatus of claim 6 wherein said dark time detector circuit comprises a precision peak detector circuit coupled with said photodetector circuit, said precision peak detector circuit operable to detect said peak amplitude of said data signal during said dark period and to output a DC voltage signal proportional to said peak amplitude.

8. The apparatus of claim 7 wherein said dark time detector circuit further comprises a comparator circuit coupled with said precision peak detector circuit, said averaging filter circuit, and said phase-locked loop circuit, said comparator circuit operable to intercompare respective input voltages from said precision peak detector circuit and said averaging filter circuit and in response thereto to output said repetitive dark time synchronization pulse.

9. A method of processing in a receiver a burst-mode input signal having a preamble portion and a payload portion, said method comprising the steps of:
    converting said input signal into a first voltage signal;
    converting said first voltage into a second voltage signal in response to a decision threshold voltage level;
    averaging said first voltage signal using an averaging frequency lower than the transmission bit rate of said input signal and higher than the burst frequency of said burst-mode input signal, to convert said first voltage signal into an average threshold value of said first voltage signal; and
    coupling said average threshold value of said first voltage converted during said preamble portion to said decision threshold voltage level during substantially all of said payload portion of said input signal.

10. The method of claim 9 wherein said transmission bit rate is approximately 12.5 gigabits per second.

11. The method of claim 9 wherein said coupling of said average threshold value occurs in response to a repetitive signal switched synchronously with said burst frequency of said burst-mode input signal.

12. The method of claim 11 wherein said synchronously switched repetitive signal is generated in a phase-locked loop circuit in response to a repetitive synchronization input pulse.

13. The method of claim 12 wherein said phase-locked loop circuit comprises circuitry selected from the group consisting of all-digital circuitry, analog circuitry, and hybrid digital and analog circuitry.

14. The method of claim 12 wherein said synchronously switched repetitive signal occurs prior to said repetitive synchronization input pulse relative to said preamble portion of said input signal.

15. The method of claim 9 wherein said receiver is an optical receiver.

16. A communication system configured for processing a burst-mode input signal having a preamble portion and a payload portion, said system incorporating:
a burst-mode receiver comprising:
a photodetector circuit operable to convert a burst-mode input signal into a first voltage signal, said input signal having a preamble portion and a payload portion;
a limiting amplifier circuit interconnected with said photodetector circuit and having a control port, said limiting amplifier circuit operable to convert said first voltage signal into a second voltage signal in response to a decision threshold voltage level at said control port;
an averaging filter circuit interconnected with said photodetector circuit, said averaging filter circuit operable to convert said first voltage signal into an average value of said first voltage signal; and
a control circuit interconnected with said averaging filter circuit, said control circuit operable to couple said average value of said first voltage converted during said preamble portion of said input signal to said decision threshold voltage level at said control port during substantially all of said payload portion of said input signal.

17. The system of claim 16 wherein said control circuit comprises a track and hold circuit operable in response to a switchable track enable signal to track said average value of said first voltage during said preamble portion of said input signal and otherwise to hold said average value of said first voltage converted during said preamble portion of said burst-mode signal and to couple said held average value to said decision threshold voltage level at said control port.

18. A communication system configured for processing a burst-mode input signal having a preamble portion and a payload portion, said system incorporating:
a burst-mode receiver comprising:
a photodetector circuit operable to convert a burst-mode input signal into a first voltage signal, said input signal having a preamble portion and a payload portion;
a limiting amplifier circuit interconnected with said photodetector circuit and having a control port, said limiting amplifier circuit operable to convert said first voltage signal into a second voltage signal in response to a decision threshold voltage level at said control port;
an averaging filter circuit interconnected with said photodetector circuit, said averaging filter circuit operable to convert said first voltage signal into an average value of said first voltage signal; and
a control circuit interconnected with said averaging filter circuit, said control circuit operable to couple said average value of said first voltage converted during said preamble portion of said input signal to said decision threshold voltage level at said control port during substantially all of said payload portion of said input signal, wherein said control circuit comprises a track and hold circuit operable in response to a switchable track enable signal to track said average value of said first voltage during said preamble portion of said input signal and otherwise to hold said average value of said first voltage converted during said preamble portion of said burst-mode signal and to couple said held average value to said decision threshold voltage level at said control port, and wherein said control circuit further comprises a phase-locked loop circuit interconnected with said track and hold circuit, said phase-locked loop circuit operable to repetitively switch said track enable signal in response to a repetitive dark time synchronization input pulse.

19. The system of claim 18 wherein said phase-locked loop circuit comprises circuitry selected from the group consisting of all-digital circuitry, analog circuitry, and hybrid digital and analog circuitry.

20. The system of claim 18 wherein said repetitively switched track enable signal occurs before said repetitive dark time synchronization input pulse relative to said preamble portion of said input signal.

21. The system of claim 16 operable to receive an input signal having a data transmission rate of approximately 12.5 gigabit per second.

22. The system of claim 18 wherein said control circuit further comprises a dark time detector circuit interconnected with said phase-locked loop circuit, said dark time detector circuit operable to generate said repetitive dark time synchronization pulse at regular intervals in response to the instantaneous amplitude of said burst-mode signal relative to a peak amplitude of said burst-mode signal during a dark period prior to said preamble portion.

23. The system of claim 22 wherein said dark time detector circuit comprises a precision peak detector circuit interconnected with said photodetector circuit, said precision peak detector circuit operable to detect said peak amplitude of said burst-mode signal during said dark period and to output a DC voltage signal proportional to said peak amplitude.

24. The system of claim 23 wherein said dark time detector circuit further comprises a comparator circuit interconnected with said precision peak detector circuit, said averaging filter circuit, and said phase-locked loop circuit, said comparator circuit operable to intercompare respective input voltages from said precision peak detector circuit and said averaging filter circuit and in response thereto to output said repetitive dark time synchronization pulse.

25. The system of claim 16 further comprising a router apparatus.

26. The system of claim 16 wherein said system is an optical communication system.

* * * * *